United States Patent [19]

Matsuno et al.

[11] Patent Number: 5,206,562
[45] Date of Patent: Apr. 27, 1993

[54] LIGHTING SYSTEM FOR USE IN VEHICLE CABIN

[75] Inventors: Yoshio Matsuno, Tokyo; Hitoshi Matsui, Kawasaki; Izumi Okamura, Hikone; Teruaki Shigeta; Yoshinori Tanabe, both of Osaka, all of Japan

[73] Assignees: Nissan Motor Co., Ltd., Yokohama; Matsushita Electric Industrial Co., Ltd., Osaka, both of Japan

[21] Appl. No.: 761,056

[22] Filed: Sep. 18, 1991

[30] Foreign Application Priority Data

Sep. 21, 1990 [JP] Japan ................... 2-253444

[51] Int. Cl.$^5$ ............................................. B60Q 1/00
[52] U.S. Cl. ....................................... 315/77; 315/84; 315/158; 307/10.8
[58] Field of Search ............... 315/77, 84, 157, 158, 315/159; 307/10.1, 10.8; 362/75, 83.3, 276, 80

[56] References Cited

U.S. PATENT DOCUMENTS

| | | |
|---|---|---|
| 2,337,794 | 12/1943 | Arenberg . |
| 2,582,738 | 1/1952 | Arenberg . |
| 2,635,681 | 4/1953 | Hiltman et al. . |
| 4,139,801 | 2/1979 | Linares . |
| 4,217,628 | 8/1980 | Windom . |
| 4,236,101 | 11/1980 | Luchaco ............... 315/158 |
| 4,368,406 | 1/1983 | Kruzich et al. ......... 315/77 X |
| 4,670,819 | 6/1987 | Boerema et al. . |
| 4,695,769 | 9/1987 | Schweickardt ......... 315/158 |
| 4,866,345 | 9/1989 | Kataoka ................ 315/84 |
| 5,047,688 | 9/1991 | Alten ................... 315/84 |

FOREIGN PATENT DOCUMENTS

| | | |
|---|---|---|
| 54-3759 | 6/1952 | Japan . |
| 59-145638 | 1/1983 | Japan . |
| 0114138 | 7/1984 | Japan ................ 315/84 |
| 61-193945 | 2/1985 | Japan . |

OTHER PUBLICATIONS

"Report of Fundamental Research on How Guide Lamp is Seen", Lighting Society of Japan, 1984.
"Adjustment of Luminance in Living Room", Meeting of Union of Kansai Branches of Electric and Related Societies, by Sotaro Matsuda, 1966.
Lighting Handbook, Nov. 30, 1987 (Japan), pp. 252, 253, 255, 267, 430 and 431.
Ser. No. 07/892,302, filed Jun. 2, 1992, Tetsuya Asada et al.
Ser. No. 07/761,057, filed Sep. 18, 1991, Yoshio Matsuno et al.
Ser. No. 07/761,052, filed Sep. 18, 1991, Yoshio Matsuno et al.
Ser. No. 07/761,054, filed Sep. 18, 1991, Yoshio Matsuno et al.

Primary Examiner—Eugene R. LaRoche
Assistant Examiner—Son Dinh
Attorney, Agent, or Firm—Lowe, Price, LeBlanc & Becker

[57] ABSTRACT

A lighting system for use in a vehicle cabin comprises a step lamp arranged to a door, a foot lamp arranged to a seat and a seat lamp arranged to a roof. An ON-OFF circuit turns on the step, foot and seat lamps when the door is opened, and turns off these lamps when the door is closed. An arithmetic circuit controls the step, foot and seat lamps in luminance to obtain a gradual increase in brightness in order of the road and step, the floor and the seat.

10 Claims, 6 Drawing Sheets

LIGHTING SYSTEM FOR USE IN VEHICLE CABIN

BACKGROUND OF THE INVENTION

The present invention relates to a lighting system for use in a vehicle cabin.

With a vehicle, it is important that a passenger who will get in the vehicle in the dark or at night can quickly ensure his security in connection with the presence of an object on a seat, etc., and smoothly settle in a cabin of the vehicle.

On the other hand, it is known that human eyes are easy to fix to a spot which is sufficiently lighter than its circumference. This is an ocular guide effect (see, for example, "Report of Fundamental Research on How Guide Lamp is Seen" published in 1984 by Lighting Society in Japan). It is also known that one obtains a sense of center when carrying out a space perception with a lighter spot as a center (see, for example, "Adjustment of Luminance in Living Room" by Sotaro MATSUDA published in 1966 at a meeting of Union of Kansai Branches of Electric and Related Societies). These effects are commonly applied to interior and exterior lightings.

With a conventionally proposed lighting system for use in a vehicle cabin, however, when any door is opened, lamps such as a ceiling light, etc. turn on therewith to uniformly illuminate the entirety of the cabin, producing shadows by a structure, etc. in the cabin, resulting in impossibility to obtain optimal illumination range and illuminance. Additionally, the aforementioned ocular guide effect and sense of center which are favorable for the passenger when getting in are out of consideration.

It is, therefore, an object of the present invention to provide a lighting system for use in a vehicle cabin which guides a passenger to a seat in providing a space perception with the seat as a center.

SUMMARY OF THE INVENTION

According to one aspect of the present invention, there is provided, in a method of controlling a lighting system for use in a cabin of a vehicle on a road, the vehicle having a door, a step, a floor, a roof and a seat, the lighting system including a step lamp arranged to the door, a foot lamp arranged to the seat and a seat lamp arranged to the roof:

checking whether or not the door is opened;

detecting brightness of the road and step, the floor and the seat when the door is opened and generating brightness indicative signals indicative of said brightness detected;

determining luminances of the step lamp, the foot lamp and the seat lamp in response to said brightness indicative signals to obtain a gradual increase in brightness in order of the road and step, the floor and the seat and generating luminance indicative signals indicative of said luminances determined; and controlling the step lamp, the foot lamp and the seat lamp in response to said luminance indicative signals.

According to another aspect of the present invention, there is provided, in a method of controlling a lighting system for use in a cabin of a vehicle on a road, the vehicle having first and second doors, steps, floors, roofs and seats, the lighting system including first and second step lamps arranged to the first and second doors, first and second foot lamps arranged to the first and second seats, and first and second seat lamps arranged to the first and second roofs:

checking whether or not the first door is opened;

detecting brightness of the road and first step, the first floor and the first seat when the first door is opened and generating brightness indicative signals indicative of said brightness detected;

determining luminances of the first step lamp, foot lamp and seat lamp in response to said brightness indicative signals to obtain a gradual increase in brightness in order of the road and first step, the first floor and the first seat and generating first luminance indicative signals indicative of said luminances determined; and controlling the first step lamp, foot lamp and seat lamp in response to said first luminance indicative signals.

According to still another aspect of the present invention, there is provided a lighting system for use in a cabin of a vehicle on a road, the vehicle having a door, a step, a floor, a roof and a seat, comprising:

a step lamp arranged to the door;

a foot lamp arranged to the seat;

a seat lamp arranged to the roof;

ON-OFF means for turning on said step lamp, said foot lamp and said seat lamp when the door is opened, and turning off said step lamp, said foot lamp and said seat lamp when the door is closed;

a first sensor so constructed and arranged as to detect a brightness of the road and step and generate a road/step brightness indicative signal indicative of said brightness of the road/step detected;

a second sensor so constructed and arranged as to detect a brightness of the floor and generate a floor brightness indicative signal indicative of said brightness of the floor detected;

a third sensor so constructed and arranged as to detect a brightness of the seat and generate a seat brightness indicative signal indicative of said brightness of the seat detected; and arithmetic circuit means for controlling said step lamp, said foot lamp and said seat lamp in luminance in accordance with said step brightness indicative signal, said floor brightness indicative signal and said seat brightness indicative signal to obtain a gradual increase in brightness in order of the road and step, the floor and the seat.

DETAILED DESCRIPTION OF THE INVENTION

Figure 1:
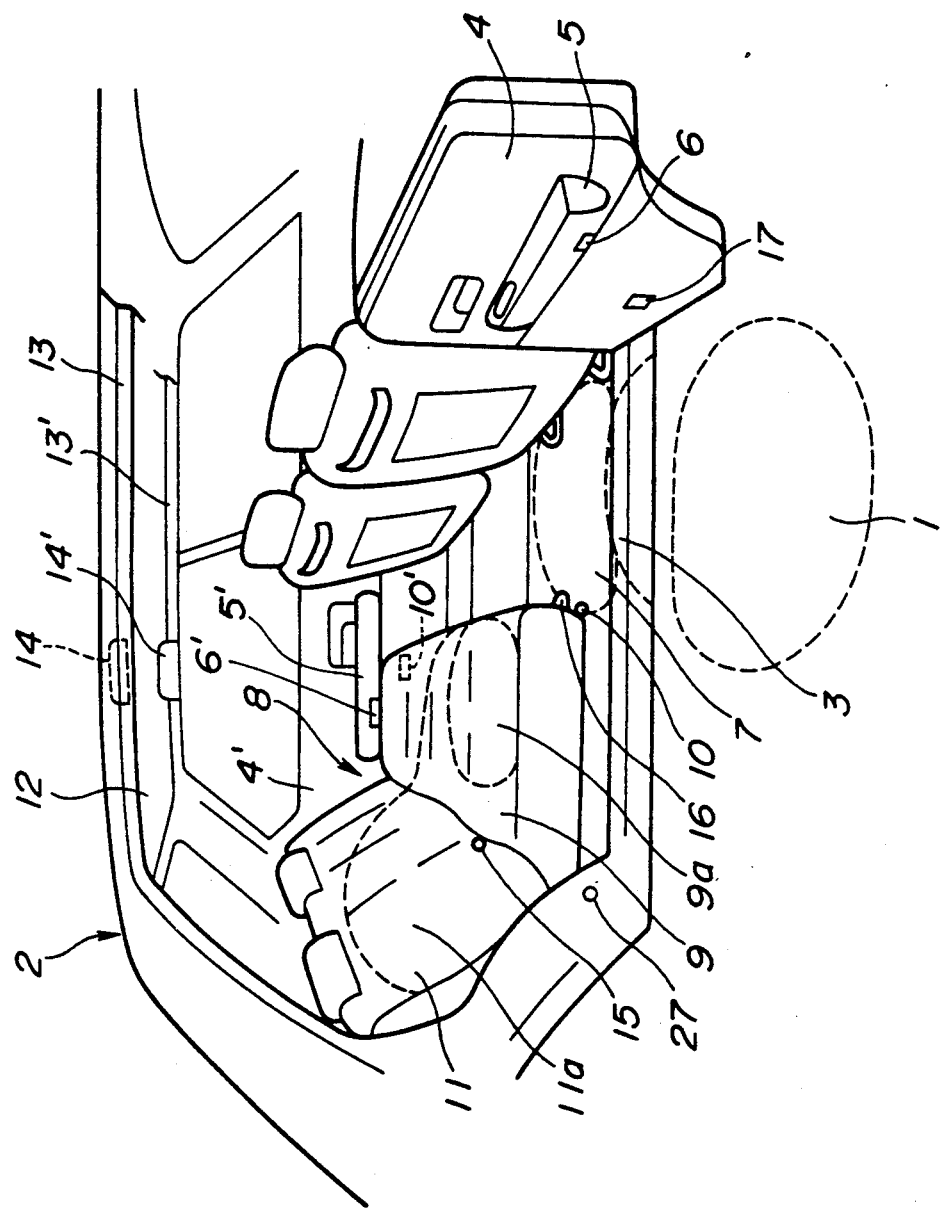
FIG. 1 is a fragmentary side view illustrating a cabin of an automotive vehicle to which a first preferred embodiment of a lighting system according to the present invention is applied.

Referring to the drawings, the structure of a first preferred embodiment of the present invention will be described.

Figure 2:
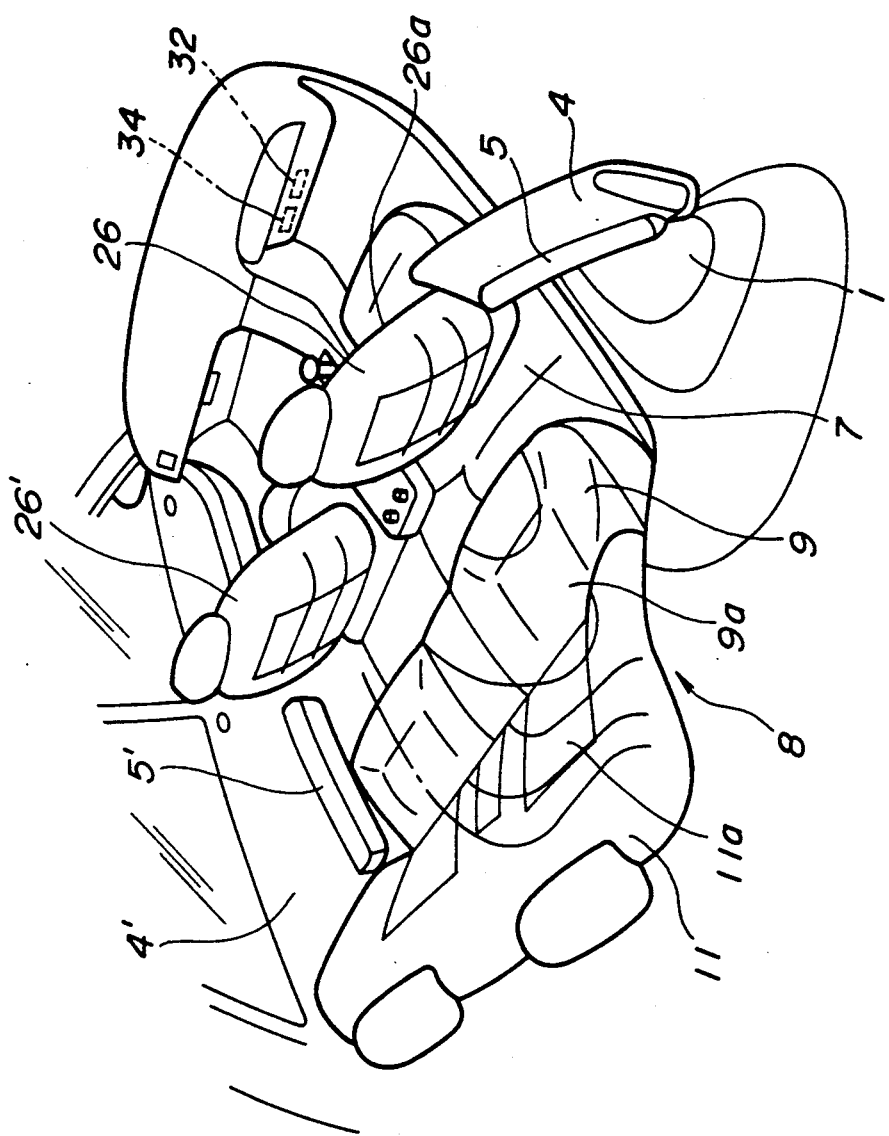
FIG. 2 is a perspective view of the cabin of an automotive vehicle of FIG. 1 with a distribution of illuminance according to the first preferred embodiment.

Referring to FIGS. 1 and 2, a lighting system for use in a cabin of an automotive vehicle includes a step lamp 6 arranged to an arm rest 5 of a door 4 for illuminating at least one of a road 1 and a step 3 of a vehicle body 2, a foot lamp 10 arranged to a seat cushion 9 of a seat 8 at the front thereof for illuminating a floor 7 in a cabin, and a seat lamp 14 arranged to a side roof rail 13 in the vicinity of a roof 12 for illuminating surfaces 9a and 11a of the seat cushion 9 and a seat back 11. It is to be noted that a reference numeral 14' designates a seat lamp arranged to a side roof rail 13', and corresponding to a door 4' opposite to the door 4.

The lighting system further includes an ON-OFF circuit 32 arranged for turning on the lamps 6, 10 and 14 when the door 4 is opened, and turning off same when the door 4 is closed, a first sensor 17 arranged for detecting the brightness of the road 1 and the step 3, a second sensor 16 arranged for detecting the brightness of the floor 7, a third sensor 15 arranged for detecting the brightness of the surfaces 9a, 11a of the seat cushion 9 and the seat back 11, and an arithmetic circuit 34.

The arithmetic circuit 34 controls the step, foot and seat lamps 6, 10 and 14 in luminance when the door 4 is opened so that the brightness of the floor 7 is greater than that one of the road 1 and the step 3, and the brightness of the surfaces 9a, 11a of the seat cushion 9 and the seat back 11 is greater than that one of the floor 7. Additionally, in a second preferred embodiment, the arithmetic circuit 34 controls in luminance the seat lamp 14' corresponding to the door 4' opposite to the door 4 as opened so as to be approximately half the luminance of the seat lamp 14 corresponding to the door 4.

Figure 4:
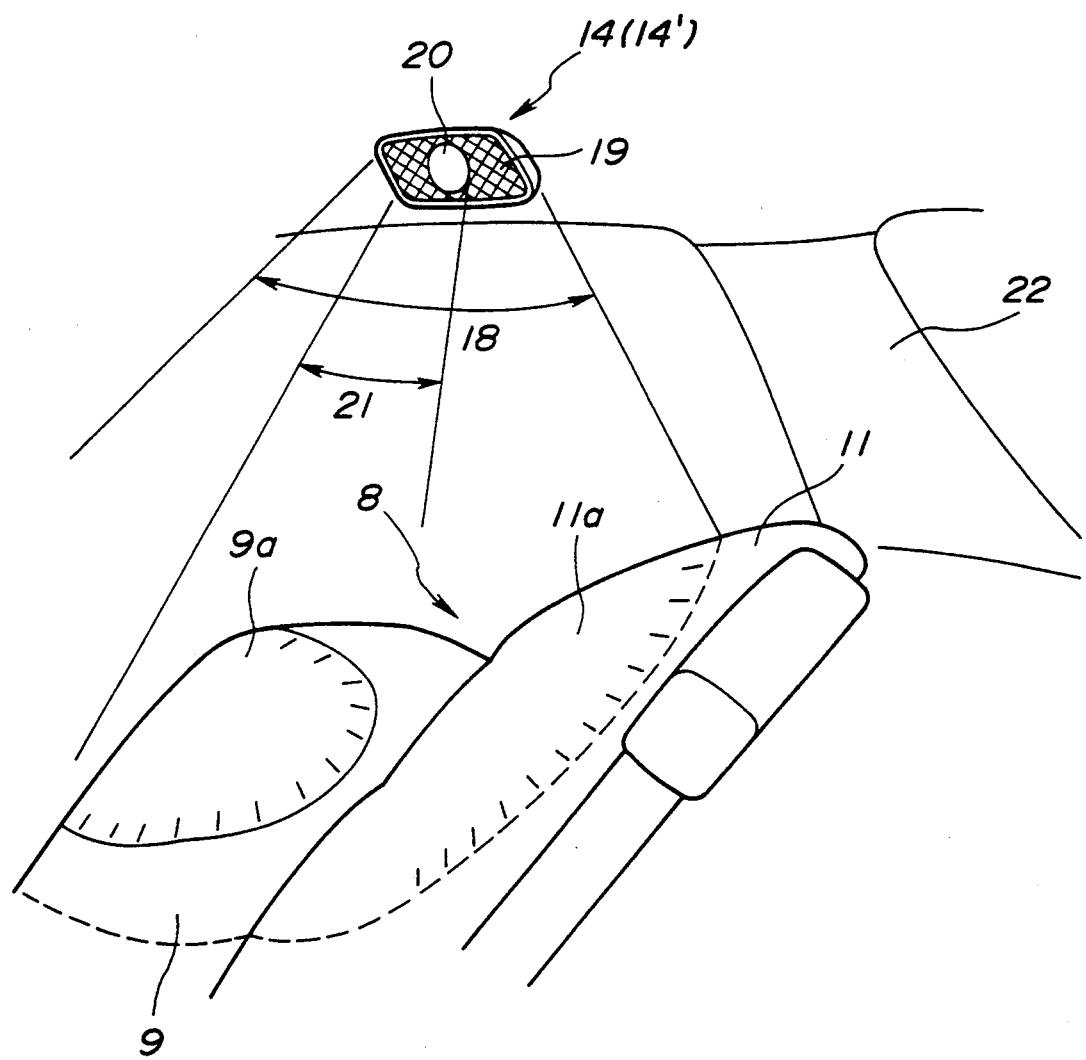
FIG. 4 is a schematic view illustrating a seat lamp with a seat and a rear pillar.

Referring to FIG. 4, each of the seat lamps 14 and 14' includes a diverging lens portion 19 corresponding to a divergent illumination range 18 for lighting up the entirety of the seat 8, and a converging lens portion 20 corresponding to a spot illumination range 21 for lighting up a part of the seat 8. The converging lens portion 20 is useful when a passenger (not shown) reads a book, etc., resulting in the increase in utility of the seat lamps 14 and 14'. It is to be noted that a reference numeral 22 designates a rear pillar.

Figure 5:
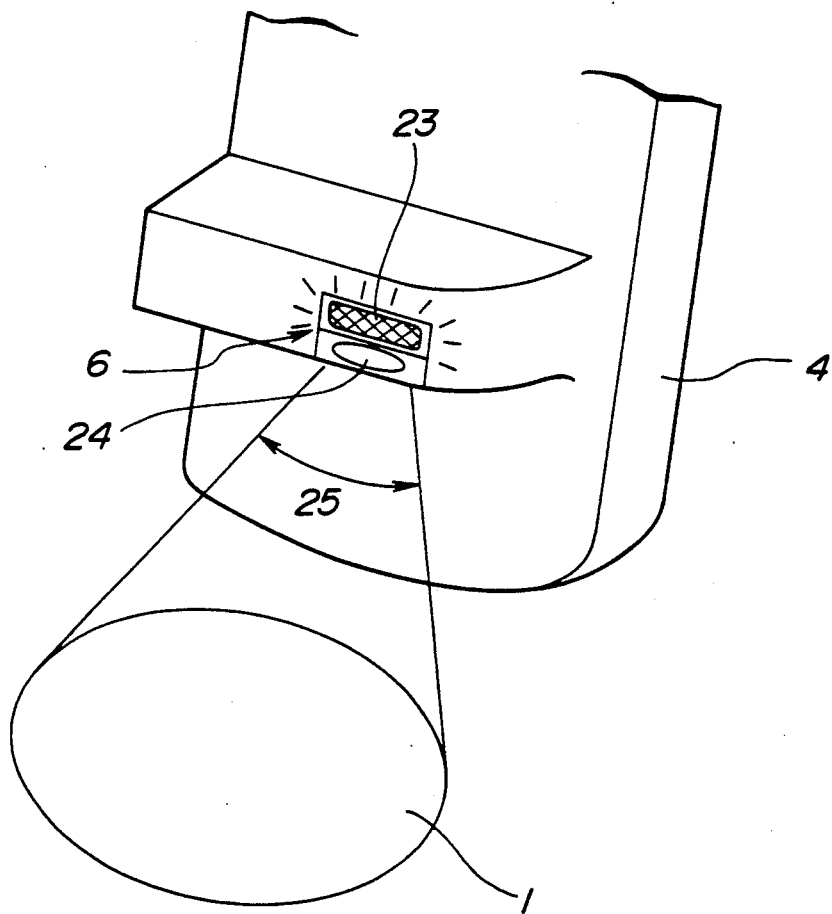
FIG. 5 is a view similar to FIG. 4, illustrating a step lamp with a road.

Referring to FIG. 5, the step lamp 6 includes a red diverging lens portion 23 for warning a driver in a follower vehicle (not shown) that the door 4 is opened, and a transparent converging lens portion 24 for lighting up the road 1 and the step 3. The red diverging lens portion 23 is effective in decreasing a glare of the step lamp 6 which a passenger (not shown) will feel when looking same directly. It is to be noted that a reference numeral 25 designates an illumination range of the transparent converging lens portion 24 which lights up the road 1 as shown in FIG. 1.

Referring again to FIG. 1, a door switch 27 is arranged to the vehicle body 2 corresponding to the door 4. When the door 4 is opened, the door switch 27 turns on the ON-OFF circuit 32 of the lamps 6, 10 and 14 related to the door 4, whereas when the door 4 is closed, the door switch 27 turns off the ON-OFF circuit 32.

Figure 6:
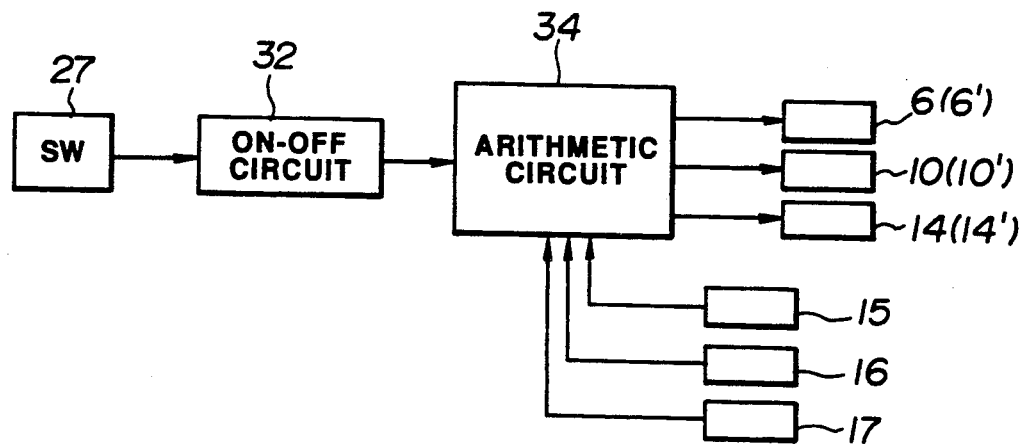
FIG. 6 is a block diagram illustrating a control system for the lighting system.
Figure 7:
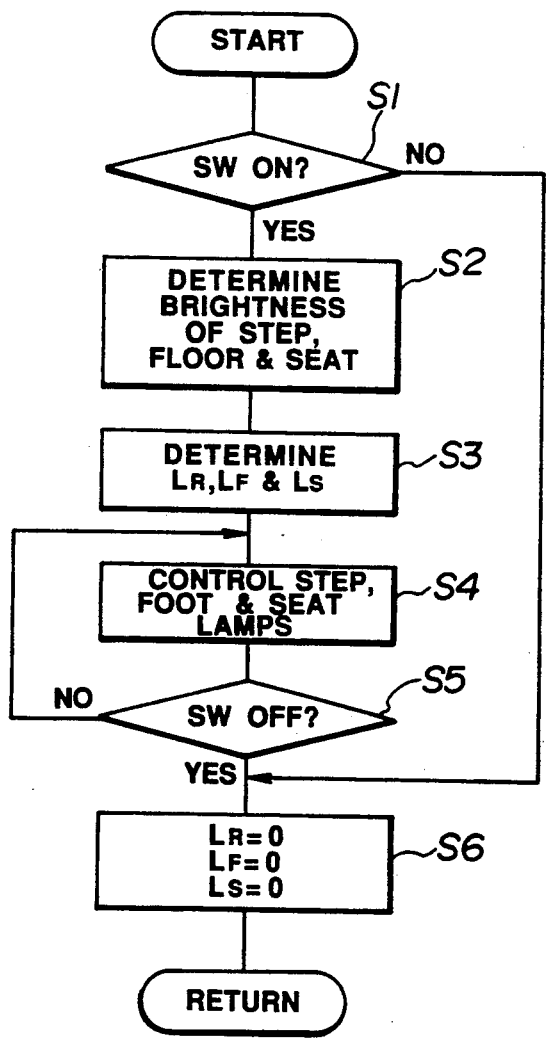
FIG. 7 is a flowchart showing the operation of the first preferred embodiment.

Referring to FIGS. 6 and 7, the operation of the first preferred embodiment will be described.

First, it is checked whether or not the door switch 27 is turned on (step S1). If the answer at the step S1 is YES, the brightness of the road 1 and the step 3, the brightness of the floor 7, and the brightness of the surfaces 9a, 11a of the seat cushion 9 and the seat back 11 are detected by the sensors 17, 16 and 15 (step S2). Luminances $L_R$, $L_F$ and $L_S$ of the step lamp 6, the foot lamp 10 and the seat lamp 14 are determined in response to the detected brightness to obtain a gradual increase in brightness in order of the road 1/the step 3, the floor 7, and the surfaces 9a, 11a of the seat cushion 9 and the seat back 11 (step S3). The step, foot and seat lamps 6, 10 and 14 are then controlled to have the determined luminances $L_R$, $L_F$ and $L_S$ (step S4). Subsequently, it is checked whether or not the door switch 27 is turned off (step S5). If the answer at the step S5 is YES, the luminances $L_R$, $L_F$ and $L_S$ are set to zero, that is, the lamps 6, 10 and 14 are turned off (step S6).

Referring to FIG. 2, there is shown a distribution of illuminance according to the first preferred embodiment. The illuminance of the road 1 is 10 lx in a portion just below the arm rest 5 of the door 4, and it decreases to 5, 3 lx, ... in accordance with a distance from the arm rest 5. Since only the seat lamp 14 (not shown) is turned on, the illuminance of the surface 9a of the seat cushion 9 is between 25 lx and 20 lx, whereas the illuminance of the surface 11a of the seat back 11 tends to decrease gradually from 20 lx to 10, 3, 2 lx, ...

With the foot lamp 10 (not shown) turned on, the illuminance of the floor 7 is 20 lx in a portion just near the seat cushion 9, and it decreases to 15 lx in a portion on the side of the front seat 26. Additionally, with the seat lamp 14 (not shown) turned on, the illuminance of the seat back 26a of the front seat 26 is between 10 lx and 5 lx on a back side thereof.

As seen from FIG. 2, the brightness of the floor 7 is greater than that one of the road 1 and the step 3, and the brightness of the surfaces 9a and 11a of the seat 8 is greater than that one of the floor 7, thus increasing an ocular guide effect toward the surfaces 9a and 11a of the seat 8, allowing the passenger to smoothly get in. Additionally, this allows the passenger to obtain a space perception with the surfaces 9a and 11a of the seat 8 as a center, producing a sense of center, resulting in a direction of hospitality to the passenger.

Figure 3:
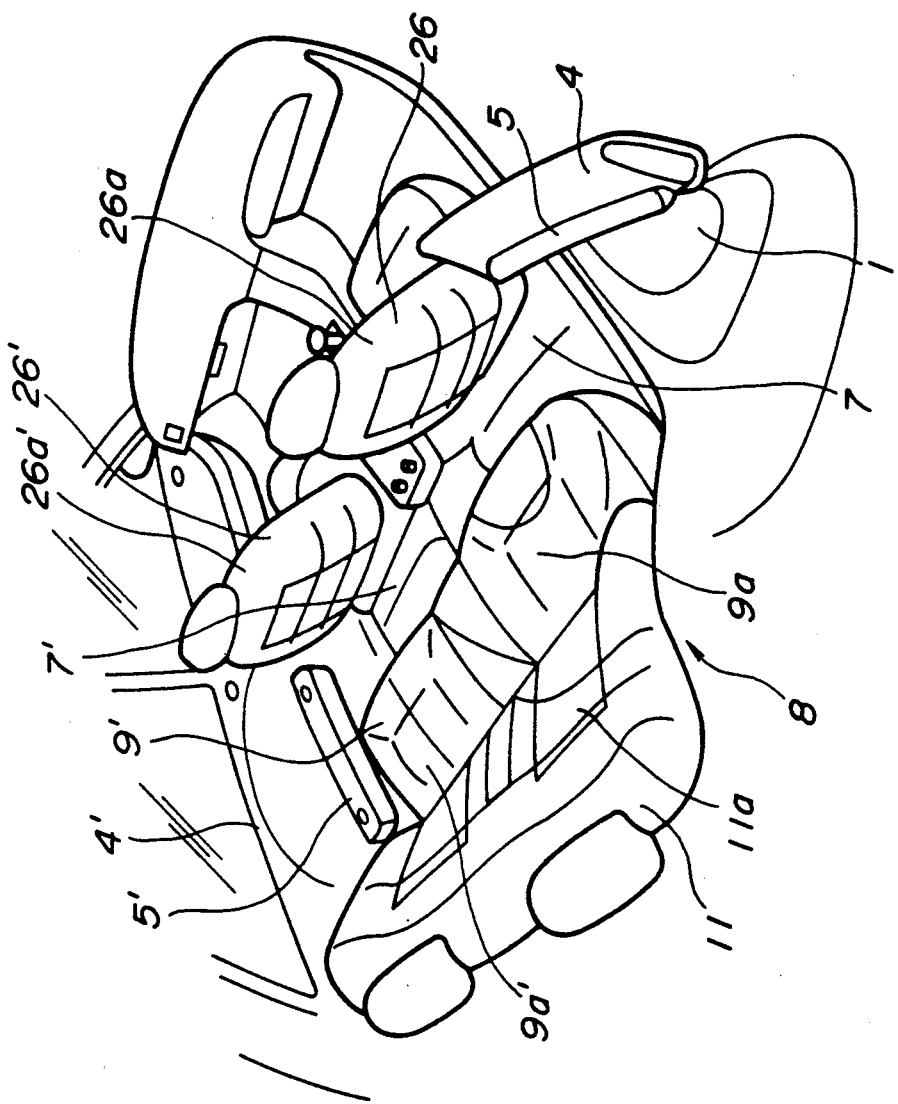
FIG. 3 is a view similar to FIG. 2, with a distribution of illuminance according to a second preferred embodiment.

Referring to FIG. 3, there is shown a distribution of illuminance according to the second preferred embodiment, i.e., the distribution of illuminance in the event the luminance of the seat lamp 14 (not shown) corresponding to the door 4 as opened is set to 100%, while the luminance of the seat lamp 14' and the step lamp 10' (not shown) corresponding to the door 4' opposite to the door 4 is set to 50%. The illuminance of the road 1 is 10 lx in a portion just below the arm rest 5 of the door 4, and it decreases to 5, 3 lx, ... in accordance with a distance from the arm rest 5.

Since the luminance of the seat lamp 14 (not shown) is 100%, and that one of the seat lamp 14' (not shown) is 50%, the illuminance of the surface 9a of the seat cushion 9 is between 25 lx and 20 lx, whereas the illuminance of the surface 11a of the seat back 11 tends to decrease gradually from 20 lx to 10, 3, 2 lx, ... On the other hand, contrary to the first preferred embodiment as shown in FIG. 2, the illuminance of a surface 9a' of a seat cushion 9' on the side of the seat lamp 14' is between 10 lx and 5 lx, while the illuminance of an arm rest 5' of the door 4' as closed is 5 lx, indicating that the brightness is extended on the seat 8.

Even with the step lamp 10' (not shown) turned on, the illuminance of the floor 7 is 20 lx in a portion just near the seat cushion 9 and it decreases to 15 lx in a portion on the side of the front seat 26, and the illuminance of the seat back 26a of the front seat 26 is between 10 lx and 5 lx on the back side thereof. On the other hand, contrary to the first preferred embodiment, the illuminance of the floor 7' adjacent to the floor 7 is between 10 lx and 5 lx, indicating that the brightness is extended on the floors 7 and 7' the same as the seat 8.

Additionally, the illuminance of a seat back 26a' of a front seat 26' on the side of the door 4' as closed is between 5 lx and 3 lx on the back side thereof, indicating that the brightness is extended also on the back sides of the seat backs 26a and 26a'.

As seen from FIG. 3, the brightness of the floor 7 is greater than that one of the road 1 and the step 3, and the brightness of the surfaces 9a and 11a of the seat 8 is greater than that one of the floor 7, thus increasing an ocular guide effect toward the surfaces 9a and 11a of the seat 8, allowing the passenger to smoothly get in. Additionally, this allows the passenger to obtain a space perception with the surfaces 9a and 11a of the seat 8 as a center, producing a sense of center, resulting in a direction of hospitality to the passenger. Further, the extension of the brightness allows the passenger to grasp largely a situation of the entirety of the seat 8 or that one of the vehicle, resulting in the increase in a sense of security when getting in.

What is claimed is:

1. A method of controlling a lighting system for use in a cabin of a vehicle on a road, the vehicle having a door, a step, a floor, a roof and a seat, the lighting system including a step lamp arranged to the door, a foot lamp arranged to the seat and a seat lamp arranged to the roof, the method comprising the steps of:
   checking whether or not the door is opened;
   detecting brightness of the road and step, the floor and the seat when the door is opened and generating brightness indicative signals indicative of said brightness detected;
   determining luminous intensities of the step lamp, the foot lamp and the seat lamp in response to said brightness indicative signals to obtain a gradual increase in brightness in order of the road and step, the floor and the seat and generating luminous intensity indicative signals indicative of said luminous intensities determined; and
   controlling the step lamp, the foot lamp and the seat lamp in response to said luminous intensities indicative signals.

2. A method as claimed in claim 1, wherein said checking step is carried out with a door switch and an ON-OFF circuit.

3. A method as claimed in claim 1, wherein said detecting step is carried out with three sensors.

4. A method of controlling a lighting system for use in a cabin of a vehicle on a road, the vehicle having first and second doors, steps, floors, roofs and seats, the lighting system including first and second step lamps arranged to the first and second doors, first and second foot lamps arranged to the first and second seats, and first and second seat lamps arranged to the first and second roofs, the method comprising the steps of:
   checking whether or not the first door is opened;
   detecting brightness of the road and first step, the first floor and the first seat when the first door is opened and generating brightness indicative signals indicative of said brightness detected;
   determining luminous intensities of the first step lamp, foot lamp and seat lamp in response to said brightness indicative signals to obtain a gradual increase in brightness in order of the road and first step, the first floor and the first seat and generating first luminous intensity indicative signals indicative of said luminous intensities determined; and
   controlling the first step lamp, foot lamp and seat lamp in response to said first luminous intensity indicative signals.

5. A method as claimed in claim 4, further comprising the steps of:
   establishing luminous intensities of the second step lamp, foot lamp and seat lamp relative to said luminous intensities of the first step lamp, foot lamp and seat lamp and generating second luminous intensity indicative signal indicative of said luminous intensities established; and
   controlling the second step lamp, foot lamp and seat lamp in response to said second luminous intensity indicative signals.

6. A method as claimed in claim 4, wherein said luminous intensities of the second step lamp, foot lamp and seat lamp are set to 0, 50% and 50%, respectively.

7. A lighting system for use in a cabin of a vehicle on a road, the vehicle having a door, a step, a floor, a roof and a seat, comprising:
   a step lamp arranged to the door;
   a foot lamp arranged to the seat;
   a seat lamp arranged to the roof;
   ON-OFF means for turning on sais step lamp, said foot lamp and said seat lamp when the door is opened, and turning off said step lamp, said foot lamp and said seat lamp when the door is closed;
   first sensor means for detecting a brightness of the road and step and generating a road/step brightness indicative signal indicative of said brightness of the road/step detected;
   second sensor means for detecting a brightness of the floor and generating a floor brightness indicative signal indicative of said brightness of the floor detected;
   third sensor means for detecting a brightness of the seat and generating a seat brightness indicative signal indicative of said brightness of the seat detected; and
   arithmetic circuit means for controlling said step lamp, said foot lamp and said seat lamp luminous intensity in accordance with said step brightness indicative signal, said floor brightness indicative signal and said seat brightness indicative signal to obtain a gradual increase in brightness in order of the road and step, the floor and the seat.

8. A lighting system as claimed in claim 7, wherein said step lamp includes a red diverging lens portion for warning a driver in a follower vehicle that the door is opened, and a transparent converging lens portion for lighting up the road and the step.

9. A lighting system as claimed in claim 7, wherein said seat lamp includes a diverging lens portion for lighting up an entirety of the seat, and a converging lens portion for lighting up a part of the seat.

10. A lighting system as claimed in claim 7, wherein said ON-OFF means include a door switch and an ON-OFF circuit.

* * * * *